Nov. 25, 1969   J. T. PAUL, JR   3,480,498
METHOD OF MAKING FILAMENT WOUND ARTICLES
Filed Sept. 12, 1966
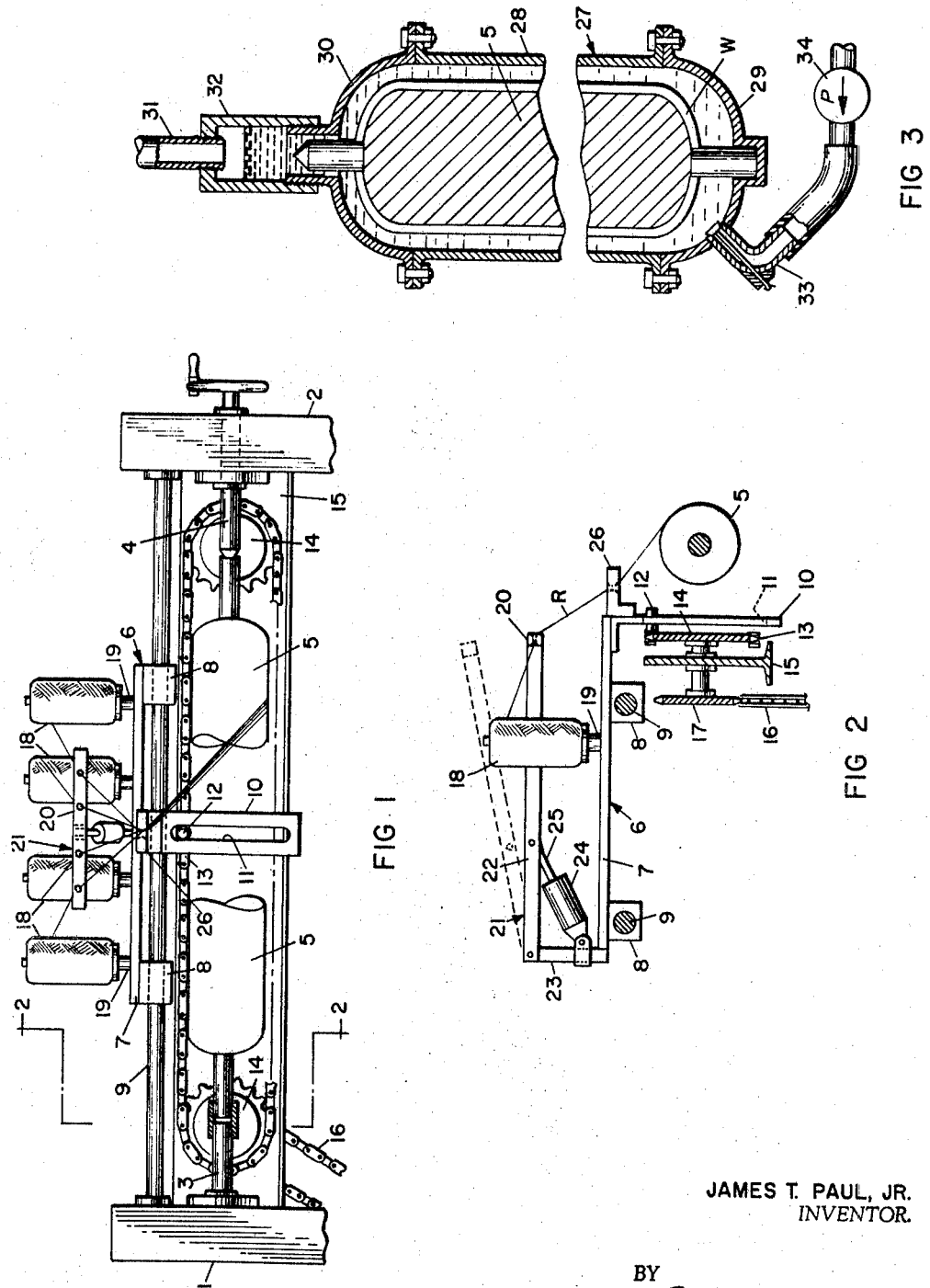
JAMES T. PAUL, JR.
INVENTOR.
BY
*Ernest G. Peterson*
AGENT

United States Patent Office 3,480,498
Patented Nov. 25, 1969

3,480,498
METHOD OF MAKING FILAMENT WOUND ARTICLES
James T. Paul, Jr., Wilmington, Del., assignor to Hercules Incorporated, Wilmington, Del., a corporation of Delaware
Filed Sept. 12, 1966, Ser. No. 578,604
Int. Cl. B32b *31/04*
U.S. Cl. 156—175
8 Claims

ABSTRACT OF THE DISCLOSURE

A method of making a low-void filament wound structure wherein the dry filaments are wound on a mandrel, which structure, after winding, is introduced into an enclosure that is then sealed and evacuated, and the binding material is introduced into the evacuated enclosure. After the binding material completely penetrates the windings, the wound structure is cured and removed from the mandrel.

---

The present invention relates to a method of making filament wound articles and particularly to a method of forming such articles with a reduced number and volume of voids.

The filament wound articles or structures of the type to which the present invention is directed have walls consisting of a wound fiber and a binding material, the fiber being of glass or other material that is characterized by a high tensile strength and light weight or, stated differently, a very high strength-to-weight ratio, and the binding material being a curable thermosetting resin, such as an epoxy polymer that is liqiud at room temperature and can be cured at temperatures within the tolerance of the fiber and which when cured becomes permanently rigid and thus binds the wound fibers into a rigid structure. These articles are designed primarily for use in applications requiring light weight as well as the capacity for withstanding high pressures or other stresses, such applications being, for example, a rocket case or the boom of a "cherry-picker."

In applicant's copending application, Ser. No. 578,605 filed simultaneously herewith, there is a discussion of the source and effect of voids in filament wound structures, and reference is made to that discussion. Briefly, the voids are caused, for example, by air that is trapped in the filaments of the fiber, or is adhered to the surface of the fiber, or is encapsulated or dissolved in the resin used as the binding material or through errors in the winding pattern, and particularly around inserts such as nozzles, or by improper handling of the fiber or the wound structure. Voids in filament wound structures significantly decrease the strength of the structure, particularly the inter-filamentary shear strength and compressive strength, and also reduce the electrical resistance and the optical clarity.

As pointed out in the discussion in applicant's above noted co-pending application Ser. No. 578,605, prior commercial efforts to eliminate voids in filament wound structures have centered around the use of heat to liberate the air from the resin and to decrease the viscosity of the resin and thereby promote penetration of the windings, and around the use of pressure during curing to collapse the voids and to increase the solubility of the air in the resin. These has also been an experimental proposal to reduce voids by mounting the winding apparatus in a vacuum. Applicant's copending application Ser. No. 578,605 relates to a method and apparatus for reducing voids in a filament wound structure by impregnating the fiber with resin in a vacuum prior to winding. This method has been found to be inexpensive in that it requires a minimum of new or special equipment and to reduce significantly the voids in the structure by eliminating those resulting from air entrained in or on the fiber or the resin or dissolved in the resin, but does not, however, eliminate all voids since the vacuum impregnation of the roving does not materially reduce voids that result from errors in the winding pattern.

The object of this invention is to provide a process for making a filament wound structure in which the number and volume of voids have been reduced to a minimum and, in fact, have been reduced substantially to the point of complete elimination, which process is reasonably economical to operate in that it requires a minimum of special equipment, is adapted to be operated at increased production rates, minimizes the loss of resin and defective windings by reducing handling and operator errors, provides increased flexibility in the production process, and is simple, dependable, trouble-free and effective.

In accordance with this invention, the above objects have been attained by winding the roving onto the mandrel before the roving or the windings are impregnated with resin, thereby producing a dry wound structure which is subsequently sealed in a closed chamber upon which a vacuum is drawn. In this manner, the air adhered to the surface of the roving or trapped in the inter-filamentary spaces thereof, as well as that which is encapsulated or dissolved in the resin, is drawn off. Impregnation of the windings by resinous binding material is therefore not hampered by trapped air nor are voids produced by the release or by the expansion of air in the windings during curing. The resulting wound structure is substantially void-free.

With the above and other objects in view, a preferred embodiment of the present invention is hereinafter described with reference to the accompanying drawings, in which:

FIG. 1 is a fragmentary elevational view of a winding machine employed in practicing the present invention.

FIG. 2 is a fragmentary sectional view taken substantially on the line 2—2 of FIG. 1.

FIG. 3 is a vertical sectional view of an impregnation chamber that is used in practicing the present invention.

The wound structure in accordance with this invention may be wound upon any conventional winding machine, for example, such as the winding machine illustrated somewhat schematically in FIG. 1. This machine comprises a pair of opposed end supports 1 and 2 with winding spindles 3 and 4 for releasably receiving the rotating mandrel 5 and upon which the filament wound structure is to be wound. To rotate the mandrel 5, it is coupled for rotation to the spindle 3 which in turn is driven by drive means (not shown) housed in the end support 1.

A roving carriage 6 is adapted to traverse back and forth along the mandrel 5 to feed roving onto the mandrel. The illustrated carriage 6 comprises a platform 7 having bearing lugs 8 that are slidably mounted on a pair of supporting rods 9 extending between the end supports 1 and 2 and having the axes thereof parallel to the axis of the mandrel 5, whereby the platform 7 is supported for movement in a path parallel to the axis of the mandrel 5. For driving the carriage 6 back and forth along the rods 9, there is an arm 10 depending from the platform 7 and having a vertical slot 11 that receives the drive pin 12 of a drive chain 13. The chain 13 is entrained about a pair of sprockets 14 that are journaled on a cross piece 15 extending between the end supports 1 and 2, the sprocket 14 adjacent to the end support 1 being driven by a chain 16 entrained about a drive sprocket 17 (FIG. 2) on the shaft of the driven sprocket 14 and about a drive sprocket (not shown) housed within the end support 1. The chain 13 with its pin 12 cooperates with the arm 10 in the manner of a scotch yoke to drive the carriage 6 back and forth as the chain 13 is driven.

The platform 7 carries a plurality of spools 18 of the winding filaments, which are provided in the form of roving R. The spools 18 are mounted on frictioned spindles 19 upstanding from the platform 7 and which impose a selected resistance to rotation of the spools 18 whereby a predetermined tension is imposed on the roving R as it is drawn from the spools. From the spools 18 the roving R passes to a roving guide 20 of a take-up mechanism 21 that is designed to take up the slack in the roving as the direction of travel of the carriage 6 is reversed at the end of each stroke, that is, as the pin 12 passes around one of the sprockets 14. The take-up mechanism 21 comprises an arm 22 having the guide 20 at one end thereof and being pivotally mounted at its other end to a bracket 23 upstanding from the platform 7. A constant bias is imposed upon the arm 22 to move the free end thereof, i.e., the end carrying the guide 20, in the direction to take up slack in the roving, which is toward the dotted line position in FIG. 2. The means for biasing the arm 22 comprises an air cylinder 24 that is pivotally mounted at one end to the bracket 23 and has the piston rod 25 thereof pivotally connected to the arm 22. When the roving is under normal tension as it is when being drawn from the spool during winding, the arm 22 is deflected to the full line position illustrated in FIG. 2. When the roving is relaxed as it is when slack is produced as the direction of travel of the carriage 6 is reversed at the end of its stroke, the arm 22 moves to the dotted line position under the action of the air cylinder 24 to take up the slack.

From the roving guide 20 at the end of the take-up arm 22, the roving R passes through a toroidal-like guide ring 26 onto the mandrel 5. In the usual manner, the pattern in which the roving R is wound on the mandrel 5 is determined by the speed of the roving carriage 6 along the mandrel 5 relative to the speed of rotation of the mandrel 5. The winding machine and the winding operation as above described are conventional in the usual wet-winding process such as that disclosed, for example, in the United States patent of R. E. Young, No. 3,025,205, Mar. 13, 1962, except that there has been eliminated the usual resin cup for impregnating the roving, such as the funnel member 45 of the Young patent. Thus, upon completion of the winding operation, the wound structure and the mandrel upon which it is wound consists only of the dry roving laid in the desired pattern on the surface of the mandrel. The roving ends of the wound structure are then secured to prevent unravelling, and the wound structure is removed from the winding machine and delivered either to storage for subsequent finishing or directly to the impregnating and curing operation.

For impregnating the wound structure with the resin that is to bind it into a rigid construction, there is provided an air-tight enclosure in the form of a rigid chamber 27 having a side wall 28 conforming to the periphery of the wound structure and sealed at its ends by a bottom end plate 29 and top end plate 30. While the end plates 29 and 30 are illustrated as being secured to the side wall 28 by bolts, it will be apparent that one or both of the end plates can be secured by a quick release fastening means which, while sufficient to provide an air-tight seal, will be quickly releasable in order to remove the end plate and thus open the chamber 27 to introduce or to remove the wound structure.

The chamber 27 is adapted to be evacuated of air and for this purpose is connected by a vacuum line 31 to a source of vacuum (not shown). Preferably, the vacuum line 31 is connected to the chamber 27 at the highest point thereof so that the vacuum may, if desired, be drawn while the resin is being or after it has been introduced into the chamber. As illustrated, the vacuum line 31 is connected to the end of a resin reservoir 32 which is in turn connected to the top plate 30 of the chamber 27. The purpose of the resin reservoir 32 is to provide sufficient resin to replace that which penetrates into the windings W and thereby keep the chamber 27 filled. There is also provided a resin-inlet conduit 33 connected to the bottom plate 29 and through which resin is adapted to be introduced into the chamber 27 and into the resin reservoir 32, and through which the excess resin is adapted to be drained upon completion of the impregnation.

For removing air from the windings W of the wound structure, the mandrel 5 with the windings thereon is introduced into the chamber 27, for example, through the top thereof, care being taken to avoid hitting the windings W against the top edge of the side wall 28 which would damage or disclocate the windings. When the wound structure is seated in the chamber 27, the chamber is sealed by replacing the end plate that was removed in order to introduce it, and a vacuum is drawn through the vacuum line 31. The vacuum is drawn, for example, to less than 5 to 10 mm. of mercury, and is preferably drawn to about 1 mm. of mercury, so that substantially all of the air is withdrawn from the chamber and from the surface and inter-filamentary spaces of the windings.

Either after the vacuum is drawn or while it is being drawn, resin is introduced into the chamber 27 through the conduit 33 until the level thereof is raised to fill the reservoir 32 at least partially, as illustrated in FIG. 3. The level of the resin is preferably controlled by introducing a measured charge of resin. One of the advantages of introducing the resin while the vacuum is being drawn is that the physical displacement of the air by the resin as the resin level rises, as well as the vaporization of the resin which tends to dilute the air, facilitates a more complete evacuation of the air in the chamber. While the vacuum in the chamber 27 would tend to de-gas the resin as it is introduced, the resin that is used is preferably degassed prior to being introduced into the chamber 27 at a vacuum level at least as low as that employed in the chamber 27. Prior de-gassing of the resin avoids the introduction into the chamber 27 otherwise entrained or dissolved in the resin, as well as the ebullition that would otherwise occur if the non-degassed resin were used.

The resin entering into the chamber 27 through the conduit 33 may flow under atmospheric pressure or may be positively pumped into the chamber as by the pump 34 illustrated diagrammatically in FIG. 3. Pumping the resin into the chamber decreases the time required to fill the chamber with resin to the desired level, and also, with the vacuum line 31 closed, provides for placing the resin in the chamber 27 under a positive pressure which decreases the time required for impregnation and also tends to collapse or to force resin into any voids remaining in the windings, which voids are now substantially air-free because of the prior vacuum de-gassing.

The time required for the resin to penetrate the windings W may vary from an hour or two to many hours, depending upon the viscosity of the resin, which can be reduced by heat, and upon the characteristics of the roving such as the diameter of the filaments or the finish thereof, which may resist or enhance wetting by the resin, or which upon aging may have bonded adjacent filaments together to inhibit penetration by the resin. The thickness and density of the fiber as determined by the tension at which it was wound are also factors. With a typical resin system, e.g., Union Carbide's ERL 4221/hexahydrophthalic anhydride/stannous octoate, and with a winding thickness of about one-quarter of an inch of fresh roving, such as Owens-Corning's P673, complete impregnation of the roving without the use of pressure requires about 6 hours.

After the windings have been thoroughly wetted with the resin, the wound structure is exposed to pressure within the chamber 27, which pressure may be positive pressure where the resin is pumped into the enclosure, or atmospheric pressure, which may be applied by disconnecting the vacuum source as the resin flows in under atmospheric pressure or by opening the enclosure after impregnation is completed. The pressure tends to collapse or to force resin into any voids that may remain, which voids are now substantially air-free. After impregnation, the resin is cured in the usual manner to produce a rigid construction.

The chamber 27, as illustrated, is made to conform to the outline of the wound structure, thereby minimizing the volume of resin required to inundate the same and the resulting waste. With the chamber 27 made to conform very closely to the outline of the wound structure, the wound structure could remain in the chamber 27 while it is cured, the chamber 27 serving to prevent the resin from draining therefrom and also serving as a mold to produce a molded finish to the structure, which thereby reduces the machining of the wound structure that would otherwise be required. However, confining the wound structure closely presents a problem in introducing the same into the chamber without hitting the windings against the mouth of the chamber and thereby dislocating or breaking the fibers. Therefore, from a practical standpoint, the chamber 27 is made to conform as closely as possible to the outline of the wound structure, while still allowing sufficient clearance so that it can be introduced into the chamber with reasonable facility.

One of the primary advantages of the present invention is that it provides for a significant increase in the speed at which winding proceeds. Because the structure is wound with dry roving and there is thus no problem with wetting the roving during the winding operation or in handling the wet roving or the wet wound structure, winding can proceed at speeds in the order of two to three times that which is normally employed in wet winding processes, that is, at speeds up to 1000 r.p.m. Production is also increased because, without roving impregnation, there is no resin to mix or to load or other tasks directly related to or aggravated by the presence of the resin during winding, so start-up is easier and quicker. There is also increased flexibility in the present process because the wound structure is dry and there is therefore no need to cure it immediately after winding as there is with a wet wound structure, but, rather, it can be stored. With the dry structure there is no problem with resin setting up, becoming contaminated or draining from the wound structure during storage. Increased productivity, of course, reduces the investment required and other overhead expenses, as well as labor expenses.

A further advantage of the present invention over the normal wet-winding process is that the exposure of the operator to the resin is materially reduced and, if the resin were mixed and fed automatically to the impregnation chamber, exposure would be substantially eliminated. In this manner, toxic reactions of the operator is minimized and cheaper resins can be used even though they may be more toxic.

Further economies over the normal wet-winding process are also obtained by virtue of the fact that resin losses are reduced. Losses by evaporation can be substantially eliminated by enclosing the windings during impregnation and controlling the air drawn by the vacuum source. Losses through spilling are reduced by reducing the handling required of the operator, such as in mixing and in filling the resin cup, and by eliminating the traveling resin cup. Losses through spoilage are reduced by effecting impregnation of the entire winding at one time from a single and more accurately measured mixing rather than continuous impregnation of the fiber as it is wound, which may require several smaller mixing because of the limited pot-life of the resin.

Additional economies are realized in that handling is facilitated and there is no requirement for cleaning the excess resin that drips or spills or is thrown from the windings, or in working around and with the resin.

What I claim and desire to protect by Letters Patent is:

1. A method of making a filament wound structure from a roving having high tensile strength and light weight and a binding material consisting of a curable thermosetting resin, said method comprising the steps of directing the roving to a guide that traverses a path parallel to the axis of the rotating mandrel of a winding machine, actuating said guide along said path in accordance with a predetermined pattern for winding the roving onto said mandrel and thereby providing a dry wound structure on the mandrel, removing the dry wound structure and mandrel from the winding machine and introducing the same into an enclosure, sealing said enclosure, drawing a vacuum on said enclosure to evacuate the air therefrom and from the wound structure therein, introducing resin into said chamber to immerse said wound structure in said resin, maintaining said wound structure in said enclosure until said resin penetrates the windings of said wound structure, and curing said resin to bind the windings on said mandrel into a rigid structure, and separating said wound structure from said mandrel.

2. The method in accordance with claim 1 in which the resin flows into said enclosure under atmospheric pressure.

3. The method in accordance with claim 2 in which the vacuum is drawn on said enclosure as the resin is introduced.

4. The method in accordance with claim 1 in which the resin is positively pumped into and is placed under pressure within said enclosure.

5. The method in accordance with claim 1 in which said wound structure is exposed to atmospheric pressure within said enclosure to collapse and to force resin into the voids in said windings.

6. The method in accordance with claim 1 in which said enclosure comprises a rigid chamber.

7. The method in accordance with claim 1 in which said wound structure is separated from said enclosure after the resin is cured.

8. The method in accordance with claim 7 in which said enclosure comprises a rigid chamber conforming closely to the configuration of said wound structure.

References Cited

UNITED STATES PATENTS

| 3,067,803 | 12/1962 | Fleury | 156—382 XR |
| 3,025,205 | 3/1962 | Young | 156—169 |
| 3,258,379 | 6/1966 | Ponemon et al. | 156—285 XR |
| 3,384,505 | 5/1968 | Palmer et al. | 117—119 XR |

PHILIP DIER, Primary Examiner

U.S. Cl. X.R.

117—119; 118—50; 156—285, 382; 220—3